United States Patent [19]
Matsumoto

[11] Patent Number: 5,493,545
[45] Date of Patent: Feb. 20, 1996

[54] MAGNETOOPTICAL RECORDING MEDIUM WITH OVERWRITE CAPABILITIES AND METHOD FOR USING THE SAME

[75] Inventor: Hiroyuki Matsumoto, Tokyo, Japan

[73] Assignee: Nikon Corporation, Tokyo, Japan

[21] Appl. No.: 352,220

[22] Filed: Dec. 2, 1994

[30] Foreign Application Priority Data

Dec. 16, 1993  [JP]  Japan .................... 5-316272

[51] Int. Cl.⁶ .................................................. G11B 11/00
[52] U.S. Cl. .................... 369/13; 360/114; 428/694 MM
[58] Field of Search .......................... 369/13, 284, 275.1, 369/275.2, 275.3, 286, 14, 110, 116; 360/59, 114; 428/694 SC, 694 EC, 694 MM

[56] References Cited

U.S. PATENT DOCUMENTS

| 5,106,704 | 4/1992 | Matsumoto | 369/13 X |
| 5,132,945 | 7/1992 | Osato et al. | 369/13 |
| 5,239,524 | 8/1993 | Sato et al. | 369/13 |
| 5,343,449 | 8/1994 | Miyata | 369/13 |
| 5,367,507 | 11/1994 | Sato et al. | 369/13 |

FOREIGN PATENT DOCUMENTS

0524745A2  1/1993  European Pat. Off. .
0536780A2  4/1993  European Pat. Off. .

Primary Examiner—Ali Neyzari
Attorney, Agent, or Firm—Oliff & Berridge

[57] ABSTRACT

An overwrite-capable magnetooptical recording medium is provided with high density recording and reproduction capabilities. Also provided is a high density reproduction method for use with such a recording medium. The magnetooptical recording medium includes at least three magnetic layers, wherein the first magnetic layer has an easily magnetized axis within the plane of the substrate and has a perpendicular magnetic anisotropy at temperatures above room temperature but below the Curie point of the second magnetic layer. The second magnetic layer has a perpendicular magnetic anisotropy at temperatures less than the Curie point, and the third magnetic layer has a perpendicular magnetic anisotropy from room temperature to nearly the Curie point. Each of the three layers of the recording medium satisfy the conditions $T_{C1} > T_{C2}$ and $T_{C2} < T_{C3}$ as well as the relationship $$H_{C2} > \frac{\sigma_{W23}}{2 M_{S2} t_2}$$

at room temperature.

21 Claims, 3 Drawing Sheets

MAGNETOOPTICAL RECORDING MEDIUM WITH OVERWRITE CAPABILITIES AND METHOD FOR USING THE SAME

BACKGROUND OF THE INVENTION

1. Field of the Invention

The present invention relates to a magnetooptical recording medium with overwrite capabilities and a magnetooptical reproduction method for using such a magnetooptical recording medium. More specifically, the present invention relates to a process for writing over existing or previously recorded information on a magnetooptical recording medium by irradiating the medium while modulating pulses of a laser beam in accordance with the information to be recorded thereon, without modulating the orientation or strength of the magnetic recording bias field Hb.

As used herein, the term "overwrite" refers to the action of recording new information on a recording medium without first erasing existing or previously recorded information. Thus, it is necessary that the previous information not be reproduced. More specifically, the term "overwrite" as used herein refers to the described process of writing over the previously recorded information on a magnetooptical recording medium.

2. Description of Related Art

Recently, there has been a great effort to develop optical recording and reproduction methods, as well as recording devices, reproduction devices and recording media that can be used with these methods, which satisfy the need for high density, large capacity, high access speed and high recording and reproduction speeds. In particular, among the wide range of optical recording and reproduction methods, the magnetooptical recording and reproduction method has the most appeal because of the unique benefit of the method wherein information that is recorded on a magnetooptical recording medium can be erased and new information recorded thereon. Additionally, the process may be repeated many times, thus allowing the magnetooptical recording medium to be reused.

A magnetooptical recording medium used in a magnetooptical recording and reproduction method has a magnetic layer or layers as a recording layer, generally applied on a protective substrate. The magnetic layer comprises, for example, amorphous GdFe, GdCo, GdFeCo, TbFe, TbCo, TbFeCo, and the like. Concentric or spiral tracks are formed on the recording layer, and data is recorded on the tracks. In the present specification, either the orientation of the magnetic field of "upward" or "downward" with respect to the surface of the recording layer is defined as the "A direction," with the opposite orientation becoming the "non-A direction."

Information to be recorded on the magnetooptical disk is digitized beforehand, and the information is recorded using two signals, namely the mark B1, which is magnetized in the A direction, and a mark B0, which is magnetized in the non-A direction. One of the marks B1 or B0 corresponds to the digital signal 1, while the other corresponds to the digital signal 0. In general recording media of the prior art, however, the magnetization of the tracks used for recording information is uniformly set to the "non-A direction" by impressing a powerful external magnetic field on the disk prior to recording. This action of uniformly setting the direction of magnetization is referred to in the art as "initializing" the disk (as the term is traditionally used). Because of this, information is recorded on the disk by creating a mark B1 having magnetization in the "A direction." Information is expressed by the presence or absence of a mark B1, the position of the mark itself, the position of the leading edge and trailing edge of the mark, and the length of the mark. In particular, the method wherein the position of the edge of the mark expresses the information is known as mark length recording. These marks were previously referred to in the art as "pits" or "bits," but are now referred to as "marks."

However, in order to reuse a medium on which recording has already been accomplished, either (1) the medium must be re-initialized (in the traditional sense of the word) using an initializing device to uniformly set the direction of magnetization of the disk; (2) an erasing head similar to the recording head must be provided on the recording device; or, (3) as a prior process, the previously recorded information must be erased using either a recording device or an erasing device. Accordingly, it has previously been impossible to overwrite using a magnetooptical recording medium wherein new information is recorded on a disk regardless of whether any previously recorded information is present.

Such overwriting may be possible if the orientation of the magnetic recording field Hb could be freely modulated between the "A direction" and the "non-A direction" as necessary. However, it is practically impossible to modulate the orientation of the magnetic recording field Hb at the required high speeds. For example, in the case where the magnetic recording field Hb is a permanent magnet, it would be necessary to mechanically reverse the orientation of the magnet such as by physically turning the magnet to change its polarity. However, it is impossible to reverse the orientation of the magnet at the required high speeds for practical recording operations. Even in the case where the magnetic recording field Hb is an electromagnet, it is impossible to modulate the orientation of such large amounts of electrical current at such a high rate.

However, with the phenomenal recent advances in technology, a magnetooptical recording method, a magnetooptical recording medium, and a recording device have been developed to provide overwrite capabilities. The overwrite capable recording method, recording medium and recording device are described in Japanese unexamined patent publication no. Sho 62-175948, German patent publication no. DE 3,619,618 A1, and U.S. Pat. No. 5,239,524, the entire disclosures of which are incorporated herein by reference. In the magnetooptical recording method, the strength of an irradiating light beam is modulated according to the digitized information being recorded without modulating the strength or orientation of the magnetic recording field Hb (including ON and OFF). The references also describe a magnetooptical recording medium with overwrite capabilities to be used with the recording method, as well as a recording device with overwrite capabilities. Hereinafter, these devices will be referred to as the "basic device."

The basic devices advantageously use a multilayered magnetooptical recording medium which has overwrite capabilities. The recording medium includes a recording and reproduction layer (referred to herein as the memory layer or the M layer) and a reference layer (referred to herein as the writing layer or the W layer). The M layer is composed of a magnetic film possessing perpendicular magnetization characteristics, whereas the W layer is composed of a magnetic film possessing perpendicular magnetization characteristics. The two layers are also exchange-coupled. At room temperature, the magnetic orientation of the M layer cannot be changed and only the magnetization of the W layer can be changed to a given specific orientation.

Furthermore, information is recorded and expressed on the magnetooptical recording medium (or disk) by forming marks having an "A direction" (magnetization) and marks having a "non-A direction" (magnetization) in the M layer. In certain cases, the marks can also be formed in the W layer.

With the described recording medium, the magnetic orientation of the W layer can be uniformly set to the "A direction" by an external means, for example, by an initializing reference magnetic field $H_{ini}$. Moreover, when the magnetic orientation of the W layer is established, the magnetic orientation of the M layer is not reversed. Furthermore, once the magnetic orientation of the W layer is uniformly set to the "A direction," it is not reversed by the exchange-coupling force from the M layer. Conversely, the magnetic orientation of the M layer is not reversed by the exchange-coupling force of the W layer, which has been uniformly set to the "A direction." As a further characteristic of the M and W layers, the W layer has a weaker coercivity force $H_C$ and a higher Curie point $T_C$ as compared to the W layer.

For use in the described magnetooptical recording method, the magnetooptical recording medium is designed such that prior to recording information thereon, only the magnetic orientation of the W layer is uniformly set to the "A direction" by an external means. This action of magnetically orienting only the W layer is referred to in this specification as "initializing" the disk. However, it is noted that the present use of the term "initialization" is different from the earlier described initialization process, because initialization of a recording media with overwrite capability is different from initialization of other media.

Recording on the recording medium may be conducted by using, for example, a pulsed laser beam. For example, a laser beam with pulses modulated in accordance with the digitized information may be used to irradiate the medium. The strength of the laser beam generally varies between a high level ($P_H$) and a low level ($P_L$), thus creating a high level and low level pulse. The strength of the low level pulse is higher than the reproduction level ($P_R$) with which the medium is irradiated during reproduction. As is already commonly known, the laser beam irradiates the medium at an "extremely low level" even when not recording in order to access, for example, a certain recording location on the medium. This "extremely low level" may be the same as or similar to the reproduction level $P_R$.

For example, when a medium that has been initialized to the "A direction" receives irradiation from a laser beam at low level $P_L$, the temperature of the medium rises and the coercivity force $H_{C1}$ of the M layer becomes very small, or in the extreme, becomes zero when the temperature of the medium rises above the Curie point $T_{C1}$ of the M layer. At this time, the coercivity force $H_{C2}$ of the W layer is sufficiently large, so the magnetic orientation of the layer is not reversed by the "non-A direction" magnetic recording field Hb. Furthermore, the force of the W layer affects the M layer through an exchange-coupling force.

The M layer and the W layer are generally composed of alloys of heavy rare earth metals (hereinafter abbreviated RE) and transition metals (hereinafter abbreviated TM). The exchange-coupling force is generally composed of a force that uniformly sets the RE magnetic moments of the two layers, and a force that uniformly sets the TM magnetic moments of the two layers. In the RE-TM alloy, the RE sub-lattice magnetization and the TM sublattice magnetization have opposite orientations, so the orientation of the larger sub-lattice magnetization determines the magnetic orientation of the alloy. When the two sub-lattice magnetizations are equivalent, the composition is referred to as the compensation composition, and the temperature is referred to as the compensation temperature. At temperatures above the compensation temperature, the TM sub-lattice magnetization is stronger; while at temperatures below the compensation temperature, the RE sub-lattice magnetization is stronger.

There are two states for marks prior to irradiation of the medium with a laser beam, namely (1) the state wherein an interface magnetic wall exists between the M layer and the W layer, and (2) the state wherein such a wall does not exist. Marks according to those formed in state (2) are preferred, because marks in state (1) wherein an interface magnetic wall exists do not match marks formed by a laser beam at low level $P_L$. However, marks in state (2) wherein an interface magnetic wall does not exist match marks formed by a laser beam at low level $P_L$. In the former case (1), the temperature of the M layer rises under irradiation by a $P_L$ beam. Consequently, the coercivity force HC1 of the M layer becomes very small. At the same time, as a result of the effect on the M layer of the force of the W layer via the exchange-coupling force, the magnetization of the M layer, which has a very small coercivity force $H_{C1}$, is oriented to a preset orientation (for example, the "A direction") supported by the W layer. As a result, a mark for the state wherein an interface magnetic wall does not exist between the M layer and the W layer (the desired mark) may be formed even in state (1).

Even when the temperature of the M layer temporarily rises slightly higher (above $T_{C1}$) and the magnetization of the M layer becomes zero, desired mark formation is not lost. When irradiation by the laser beam ends, the temperature of the recording medium naturally drops and gradually falls to a value below the Curie point $T_{C1}$. When this occurs, the magnetization of the M layer reappears. At the same time, the force of the W layer has the same effect on the M layer via the exchange-coupling force. Consequently, the magnetization that appears in the M layer is oriented to a preset orientation (for instance, the "A direction") supported by the W layer. When the recording medium returns to room temperature from this condition, the preset orientation is preserved. However, when the compensation temperature is passed in either the M layer or the W layer during the return to room temperature, the orientation of the magnetization of the respective layer is reversed. This process provides the same marks as in the latter case (2) described above, and is known as the low temperature process or the low temperature cycle.

On the other hand, when a medium initialized for example to the "A direction" is irradiated by a laser beam at a high level $P_H$, the temperature of the medium rises, the coercivity force $H_{C1}$ of the M layer becomes zero, and the coercivity force $H_{C2}$ of the W layer becomes very small, or in the extreme, becomes zero. Consequently, the magnetization of the W layer, which has a very small coercivity force $H_{C2}$, is oriented to a preset orientation (for example, the "non-A direction") by the magnetic recording field Hb. Even in cases where the temperature of the W layer temporarily rises slightly further and the magnetization of the W layer becomes zero, desired mark formation is not lost. When irradiation by the laser beam ends and the temperature of the recording medium naturally drops and gradually falls below the Curie point $T_{C2}$, the magnetization of the W layer reappears. At this time, the magnetization of the W layer is oriented in the same way to a preset orientation (for example, the "non-A direction") under the magnetic recording field Hb. As the recording medium further cools and gradually drops below the Curie point $T_{C1}$, the magnetization of the M layer also reappears. At this time, the force of the W layer has an effect on the M layer via the exchange-coupling force. Consequently, the magnetization that appears in the M layer is oriented to the preset orientation (for example, the "non-A direction") supported by the W layer. As the recording medium returns to room temperature from this condition, the preset orientation is preserved. However, when the compensation temperature is passed in either the M layer or the W layer during the return to room temperature, the orientation of the magnetization in the respective layer is reversed. This process is known as the high temperature process or the high temperature cycle.

The above-described low temperature process and high temperature process may be accomplished with no relation to the magnetic orientation of the M layer and the W layer. In any event, it is desirable for the W layer to be initialized prior to irradiation by the laser beam, thereby making overwriting possible.

With the basic devices, the laser beam is modulated in terms of pulses in accordance with the information to be recorded. However, this process may also be accomplished using conventional magnetooptical recording media, since the means for modulating the beam strength as pulses in accordance with digitized information to be recorded on the recording medium is well known. Such a means is explained, for example, in detail in The Bell System Technical Journal, Vol. 62 (1983), 1923–1936, the entire disclosure of which is incorporated herein by reference. Accordingly, alternative modulations are easily obtainable by adjusting the existing modulation means to the desired necessary high level and low level of the beam strength. One skilled in the art would readily recognize how to make such adjustments to the modulating means if a high level and a low level of the beam strength are provided.

A special characteristic of the basic devices is the high level and low level strength of the laser beam. When the beam strength is at the high level, the "A direction" magnetization of the W layer is reversed to the "non-A direction" by the magnetic recording field Hb or another external means. Through this "non-A direction" magnetization of the W layer, a mark is formed in the M layer having "non-A direction" magnetization (or "A direction" magnetization). When the beam strength is at the low level, the orientation of the W layer magnetization is unchanged from the initialized state, and through the operation of the W layer (this operation being the transfer to the M layer through the exchange-coupling force), a mark is formed in the M layer having an "A direction" magnetization (or "non-A direction" magnetization).

The recording medium used in the basic devices has a multiple layer structure including an M layer and a W layer. The M layer comprises a magnetic layer wherein the coercivity force is high at room temperature and the magnetization reversal temperature is low. The W layer is a magnetic layer wherein, in contrast to the M layer, the coercivity force is weak at room temperature and the magnetization reversal temperature is high. Both the M layer and the W layer can also be comprised of multiple layers themselves. In certain cases, an intermediate layer can exist between the M layer and the W layer. For example, an intermediate layer with an exchange-coupling force of $\sigma_w$ may exist between the M and W layers. Hereinafter, this intermediate layer will be referred to as the I layer. Further information about the I layer can be found by referring to Japanese unexamined patent publications Sho 64-50257 and Hei 1-273248, the disclosures of which are totally incorporated herein by reference.

In addition, a number of references are available with reference to magnetooptical recording with overwrite capabilities, including Japanese unexamined patent publications Hei 4-123339 and Hei 4-134741, which are totally incorporated herein by reference, but further explanation is omitted here. A disk having a four layer structure, which is disclosed in Japanese unexamined patent publication Hei 4-123339, has, in addition to an M layer and a W layer, an initializing layer (hereinafter abbreviated as an Ini layer), and a switching layer (hereinafter abbreviated as a S layer) between the Ini layer and the W layer. The S layer switches the exchangecoupling force between the two layers on and off.

In order to boost the C/N value, a structure for a magnetooptical recording medium has been proposed that also includes a readout layer (hereinafter abbreviated as a R layer) above the M layer (i.e., on the side of the disk on which the laser beam is incident). The R layer should have a higher Curie point and a higher Kerr effect than the M layer. Such a structure is described, for example, in Japanese unexamined patent publications Sho 63-64651 and Sho 63-48637, the entire disclosures of which are incorporated herein by reference. This proposed R layer is also comprised of a RE-TM alloy.

Because recording on a magnetooptical recording medium is usually accomplished using the thermal energy of a laser beam, quite small marks are made by using the center of the beam spot. However, because reproduction is accomplished by optically reading the medium using a narrowed laser beam, it is in principle impossible to accomplish reproduction using a beam spot that is smaller than the refraction limit. At present, given the wavelength of semiconductor lasers that are commercially available, the beam diameter cannot be made smaller than about 1 μm. Consequently it is generally impossible to make the size of the marks much smaller than 1 μm. For this reason, the spacing of marks on the track and the spacing between tracks (track pitch) is restricted.

Accordingly, when either of the restrictions as to mark size and track spacing is exceeded, for example when the spacing between marks on a track is made smaller in order to produce high density recordings, several marks are reproduced simultaneously. In addition, when the spacing between tracks (track pitch) is reduced beyond the size restriction, the result is a high degree of simultaneous reproduction of marks on adjacent tracks, otherwise known as "cross talk." In either case, the quality of the reproduction signal cannot be maintained (the C/N value becomes smaller), and as a result the reproduction of the information cannot be properly accomplished.

These restrictions have placed an effective limit on the recording density of a magnetooptical recording medium. In the case of a magnetooptical recording medium with overwrite capabilities, these restrictions are aggravated because the conditions needed to make overwriting possible also have to be met.

SUMMARY OF THE INVENTION

It is an object of the present invention to overcome the above-described problems associated with the prior art.

It is another object of the present invention to provide a reproduction method to play back marks that are smaller than the diameter of the laser beam spot.

It is a further object of the present invention to reduce the spacing between marks on a track and the spacing between tracks, thereby providing a high density magnetooptical recording medium with overwrite capabilities.

As a result of research to solve these problems, it has been discovered that reproduction of marks considerably smaller than the reproduction beam diameter may be accomplished and overwrite recording may also be accomplished using a magnetooptical recording medium having three magnetic layers that meet special magnetic conditions. The present invention is directed to such a magnetooptical recording medium, and a magnetooptical recording method for use therewith.

DETAILED DESCRIPTION OF PREFERRED EMBODIMENTS

Figure 1:
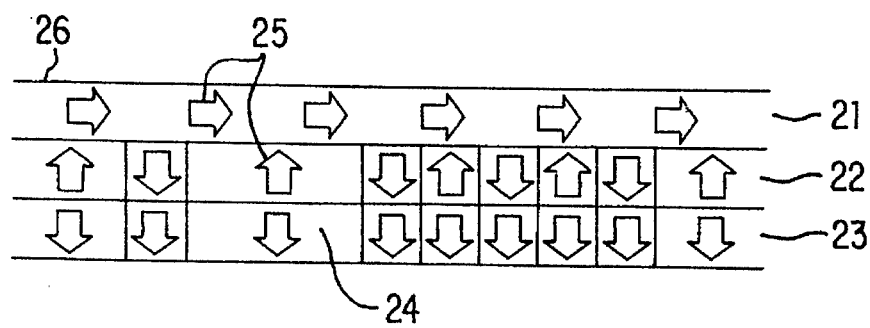
FIG. 1 is a vertical cross-sectional view of a recording medium created in accordance with a first embodiment of the present invention.

The magnetooptical recording medium of the present invention and used with the present magnetooptical recording and reproduction method, may be composed of either one or a plurality of groups of layers having perpendicular magnetic properties (hereinafter referred to as perpendicular magnetic layers). It is on these layers where recording of information takes place. The magnetic layers may be made, for example, of a substance exhibiting a vertical magnetic anisotropy and a magnetooptical effect. Preferably, the magnetic layers may be made from an amorphous magnetic alloy of a rare earth element and a transition metal element. For example, the magnetic layers may be made from magnetic alloys including, but not limited to, GdFe, GdCo, GdFeCo, TbFe, TbCo, TbFeCo, DyFe, GdTbFe, TbDyFe, GdTbCo, DyFeCo and GdTbFeCo.

Preferably, the magnetooptical recording medium has a disk shape. The perpendicular magnetic layers generally have concentric circular or spiral-shaped tracks, on which information may be recorded. The tracks may generally be of two types, namely those that are explicitly formed in the magnetic layer and those that are implicitly formed in the magnetic layer. In disks having explicitly formed tracks, the tracks on which the information is recorded are in a curled shape or in the form of concentric circles when viewed from a direction perpendicular to the plane of the disk. Furthermore, a groove is provided between two adjacent tracks for the purpose of tracking and separation. Thus, the grooves may also be in the form of a spiral-shaped curve or concentric circles. The area between two adjacent grooves is referred to as a "land." In actuality, the relationship between lands and grooves is reversed on the back surface of the disk. Thus, the area on the side of the disk toward the direction from which a laser beam is incidental is called a groove, and that on the opposite side is called a land. The perpendicular magnetic layers may thus be formed as one surface over both the grooves and the lands. In embodiments, it is equally appropriate to make either the grooves or the lands the tracks on which the information is recorded. There is no specific relationship in size between the groove width and land width.

In this way, lands formed in a spiral shape or in the shape of concentric circles, and grooves between each neighboring pair of lands are provided on the surface of the substrate. The perpendicular magnetic layers may then be formed as thin layers on such a substrate. Therefore, the perpendicular magnetic layers have both lands and grooves.

Accordingly, the present invention provides a magnetooptical recording medium with overwrite capabilities. The recording medium has at least three magnetic layers in the substrate, referred to herein as the first magnetic layer, second magnetic layer, and third magnetic layer. The first magnetic layer preferably has an easily magnetized axis in the plane of the substrate at room temperature and an easily magnetized axis perpendicular to the substrate at temperatures between room temperature and the Curie point of the second magnetic layer. The second magnetic layer preferably has an easily magnetized axis perpendicular to the substrate at temperatures between room temperature and the Curie point of the second magnetic layer. Similarly, the third magnetic layer preferably has an easily magnetized axis perpendicular to the substrate at temperatures between room temperature and the Curie point of the third magnetic layer.

As such, all three magnetic layers are designed to satisfy the following relationships (1)–(3):

$$T_{C1} > T_{C2} \tag{1}$$

$$T_{C2} < T_{C3} \tag{2}$$

and at room temperature, $$H_{C2} > \frac{\sigma_{w23}}{2M_{S2}t_2} . \tag{3}$$

Here, $T_{C1}$, $T_{C2}$ and $T_{C3}$ represent the Curie points of the first, second and third magnetic layers, respectively; $H_{C2}$ is the coercivity force of the second magnetic layer; $M_{S2}$ is the saturation magnetic moment of the second magnetic layer; $t_2$ is the thickness of the second magnetic layer, and $\sigma_{w23}$ is the magnetic wall energy between the second and third magnetic layers.

In formula (3), and other formulas specified below, the quantity $\sigma_w/2M_s t$ indicates the magnitude of the exchange force received by a magnetic layer, or represents the magnitude of a magnetic field acting to rearrange the direction of magnetization of the magnetic layer in a stable direction with respect to the direction of magnetization of another magnetic layer. For example, the quantity $\sigma_{w23}/2M_{S2}t_2$ in formula (3) represents either the magnitude of the exchange coupling force received by the second magnetic layer from the third magnetic layer, or represents the magnitude of a magnetic field acting to rearrange the direction of magnetization of the second magnetic layer in a stable direction with respect to the direction of magnetization of the third magnetic layer. Therefore, in order that the specific magnetic layer (here, the second magnetic layer) can retain its magnetization unchanged against the magnetic field, the layer should have a coercivity $H_C$ (here, $H_{C2}$) larger than the magnitude of the magnetic field. These quantities and relationships are further discussed in U.S. Pat. No. 5,132,945, the entire disclosure of which is incorporated herein by reference.

In a second embodiment of the present invention, it is preferred that the magnetooptical recording medium of the present invention is designed to satisfy relationships (1)–(3) above, and additionally satisfy the following relationship (4) among the magnetic layers at room temperature:

$$H_{C2} - \frac{\sigma_{w23}}{2M_{S2}t_2} > H_{C3} + \frac{\sigma_{w23}}{2M_{S3}t_3} \quad (4)$$

Here, $H_{C2}$ and $H_{C3}$ represent the coercivity force of the second and third magnetic layers, respectively; $M_{S2}$ and $M_{S3}$ represent the saturation magnetic moments of the second and third magnetic layers, respectively; $t_2$ and $t_3$ represent the thicknesses of the second and third magnetic layers, respectively; and $v_{w23}$ is the magnetic wall energy between the second and third magnetic layers.

In yet another embodiment of the present invention, it is also preferred that the magnetooptical recording medium satisfy all of relationships (1)–(4) above, and further satisfy the following relationship (5) among the magnetic layers at room temperature;

$$H_{C3} > \frac{\sigma_{w23}}{2M_{S3}t_3} \quad (5)$$

Here, $H_{C3}$ represents the coercivity force of the third magnetic layer, $M_{S3}$ represents the saturation magnetic moment of the third magnetic layer, $t_3$ represents the thickness of the third magnetic layer, and $\sigma_{w23}$ is the magnetic wall energy between the second and third magnetic layers.

The second and third magnetic layers in the magnetooptical recording medium of the present invention are preferably both comprised of a RE-TM alloy, as described above for the first magnetic layer.

In embodiments of the present invention, the magnetooptical recording medium may comprise more than three magnetic layers. For example, in embodiments, a fourth magnetic layer may be provided between the second magnetic layer and the third magnetic layer.

In addition to the three (first, second and third) magnetic layers, the recording medium of the present invention may comprise further layers, such as a fourth and/or fifth magnetic layer. Such a fourth magnetic layer may be positioned, for example, between the second and third magnetic layers for the purpose of controlling the exchange-coupling force. The fourth magnetic layer may be made of a RE-TM alloy, or of a rare earth or transitional metal or metals alone. In the case of the fourth magnetic layer, an easily magnetized axis of the layer may occupy the plane of the substrate or be perpendicular to the plane of the substrate at room temperature.

In other embodiments of the present invention, a fifth magnetic layer may be incorporated into the magnetooptical recording medium. For example, a further layer may be included as an initializing layer. Such a further magnetic layer may be positioned in the recording medium so as to initialize the third magnetic layer. Similar to the fourth magnetic layer, the fifth magnetic layer may be made of either an RE-TM alloy, or of a rare earth or transitional metal or metals alone.

Although the exchange coupling force layer and the initializing layer have been described and referred to herein as a "fourth" and "fifth" magnetic layer, it is not necessary that the exchange coupling force layer be present in order for the initializing layer to be present. That is, the two layers may independently be either incorporated into or omitted from the magnetooptical recording medium as desired. Additionally, other layers may be incorporated into the recording medium for their known purposes.

Furthermore, the present invention provides a magnetooptical reproduction method for playing back information previously recording on the magnetooptical recording medium. Such reproduction generally comprises rotating the recording medium, irradiating the recording medium with a laser beam and converting the light reflected from the rotating medium into an electrical signal.

Reproduction according to the process of the present invention is accomplished by irradiated the medium with a laser beam, thereby causing the temperature of the first magnetic layer to rise to a temperature between room temperature and the Curie point $T_{C2}$ of the second magnetic layer. This heating causes the saturation magnetic moment $M_{S1}$ of the first magnetic layer to diminish, thereby creating a state wherein the magnetization of the first layer is oriented perpendicular to the surface, following the sub-lattice magnetization of the second magnetic layer. Under these conditions, information may be reproduced from the recording medium by converting the light reflected from the medium into an electrical signal.

A vertical cross-sectional perspective view of the magnetic layers of a magnetooptical recording medium according to the present invention is shown in FIG. 1. The magnetooptical recording medium 26 comprises a first magnetic layer 21, a second magnetic layer 22 and a third magnetic layer 23. The recording medium also has an interface magnetic wall 24 between the second and third magnetic layers. The arrows 25 indicate the orientation of the TM sub-lattice magnetization. The TM sub-lattice magnetization is shown for the layers because the Kerr effect, which comprises the basic principle of reproduction, depends on the TM sub-lattice magnetization. A recording medium having this structure, and the way in which said medium functions, is explained hereafter with reference to FIG. 2.

Figure 2:
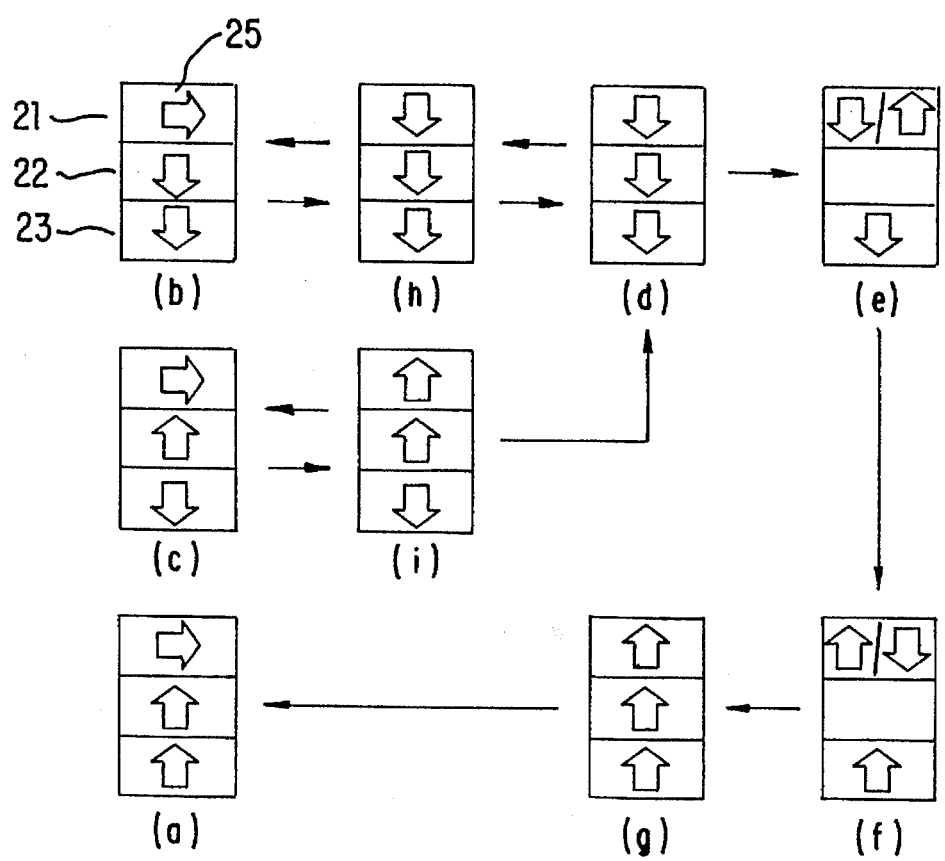
FIG. 2 is a perspective view explaining the overwrite recording principle used in the recording medium created in accordance with an embodiment of the present invention.

A magnetooptical recording medium according to the present invention may have a magnetic state such as shown in either part (a) or part (b) of FIG. 2. Such state exists immediately after recording. From this state, the third magnetic layer (the W layer) is initialized using an initializing means. The initializing means may be any device that causes the magnetization of the third magnetic layer to be oriented in a single direction. Thus, it may be an initializing reference magnetic field applied to the outside of the magnetooptical recording medium. Alternatively, an Ini layer (initializing layer) may be provided in the magnetooptical recording medium. The initialized state of the third magnetic layer is shown in state (b) or state (c) of FIG. 2 (there being no change in the magnetic orientation of the third magnetic layer in state (b)). At this time, it is critical that the magnetization of the second magnetic layer (the M layer) not change, and the conditions that accomplish this are that at room temperature the relationship (3) must be satisfied:

$$H_{C2} > \frac{\sigma_{w23}}{2M_{S2}t_2} \quad (3)$$

When initializing of the third magnetic layer is accomplished using an external initializing reference magnetic field, it is necessary to reverse only the magnetization of the third magnetic layer with this initializing reference magnetic field. The conditions that accomplish this are that at room temperature the relationship (4) must be satisfied:

$$H_{C2} - \frac{\sigma_{w23}}{2M_{S2}t_2} > H_{C3} + \frac{\sigma_{w23}}{2M_{S3}t_3} \quad (4)$$

However, this formula need not be satisfied in all cases. For example, it is not necessary when an Ini layer is provided in the magnetooptical recording medium. Preferably, in order for the initialized third magnetic layer to maintain these conditions, the following relationship (5) should be satisfied by the recording medium:

$$H_{C3} > \frac{\sigma_{w23}}{2M_{S3}t_3} \quad (5)$$

However, methods of maintaining the initialized state of the third layer using an external magnetic field or the like with a separate means have already been proposed. For example, such methods are disclosed in Japanese unexamined patent publication Sho 63-285740, the entire disclosure of which is incorporated herein by reference. In these cases, the recording medium need not satisfy formula (5).

Next, the recording process will be described. Overwrite recording may be accomplished on a magnetooptical recording medium having the magnetic condition of state (b) or (c) of FIG. 2 by irradiating the medium with a narrowed (focused) laser beam. The irradiation may be accomplished, for example, by using an irradiating optical system while modulating the beam to a high level or a low level in accordance with information that has been digitized by an appropriate digitizing means (e.g., an analog-to-digital converter).

When irradiation is conducted with a laser beam at a low level, the temperature of all of the magnetic layers rises, and state (d) of FIG. 2 results. That is, the magnetic state of the second magnetic layer and the third magnetic layer of state (b) are maintained, with magnetization of the second magnetic layer being reversed in state (c) by the release of magnetic wall energy between the second magnetic layer and the third magnetic layer. In all cases, the magnetic anisotropy of the first magnetic layer (the R layer) changes from an orientation in the plane of the substrate to an orientation perpendicular to the plane of the substrate because of the rise in temperature. Furthermore, from this state the medium moves to state (b) as the medium cools.

When irradiation is conducted with a laser beam at a high level, the magnetic layers rise to a higher temperature than in the case of irradiation with a low level laser. Because the relationships (1) and (2)

$$T_{C1} > T_{C2} \quad (1)$$

$$T_{C2} < T_{C3} \quad (2)$$

hold among the first magnetic layer, the second magnetic layer and the third magnetic layer, the recording medium moves from state (d) through state (e) to state (f) of FIG. 2 as the Curie point of the second magnetic layer is exceeded. The magnetization of the third magnetic layer reverses because the magnetic recording field Hb works in the direction that causes reversal of the magnetization of the third magnetic layer. At this time, the first magnetic layer follows the magnetic recording field Hb, but the orientation of magnetization will differ depending on whether the TM sub-lattice magnetization is greater than the RE sub-lattice magnetization (hereinafter referred to as TM rich), or whether the RE sub-lattice magnetization is greater than the TM sub-lattice magnetization (hereinafter referred to as RE rich). As the medium cools, the medium moves from state (f) to state (g) when the magnetization of the second magnetic layer returns as the temperature drops below the Curie point TC2 of the second magnetic layer. The medium then moves to state (a) as the medium cools further. When the third magnetic layer is initialized by an initializing means from this state, the medium moves to state (c).

Figure 5:
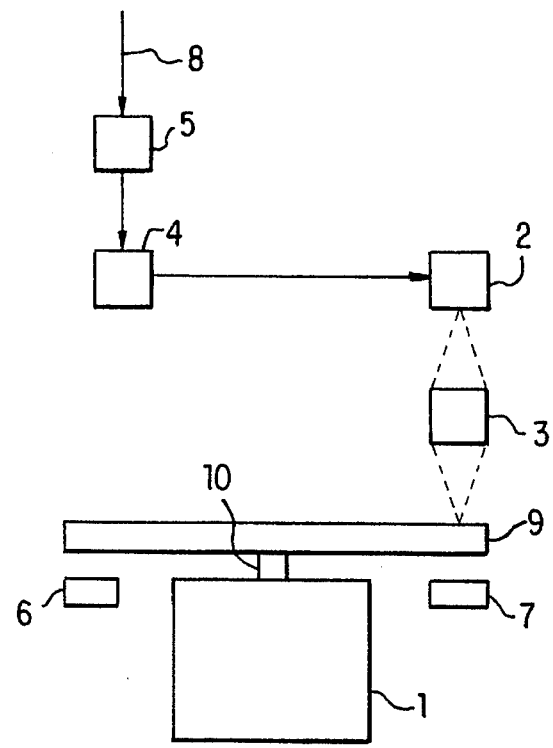
FIG. 5 is a summary drawing of the recording device according to an embodiment of the present invention.

An embodiment of the recording device of the present invention is generally shown in FIG. 5. The device primarily comprises a motor 1 for causing rotation of the magnetooptical disk 9, for example by shaft 20, a laser beam light source 2, an irradiating optical system 3 for conducting the beam to the magnetooptical disk, a modulation circuit 4, a digitized information input unit 5, an initializing reference magnetic field 6 and a magnetic recording field 7 disposed opposite the irradiating optical system 3. The initializing reference magnetic field 6 may, for example, be comprised of a permanent magnet that produces a magnetic field in the direction of the A orientation on the surface of the magnetooptical recording medium. Similarly, the magnetic recording field 7 may, for example, be comprised of a permanent magnet that produces a magnetic field in the direction of the A orientation on the surface of the magnetooptical recording medium. The laser beam light source 2 may be comprised of a semiconductor laser or other suitable light source.

The recording device functions as follows: The magnetooptical disk 9 is rotated by the motor 1 and first passes through the initializing reference magnetic field 6. Subsequently, the laser beam light source 2 is modulated by the modulation circuit 4 in accordance with the digitized information 8 to be recorded. Recording is accomplished by irradiating the magnetooptical disk 9 as it passes through the irradiating optical system.

A description of the reproduction process will now be provided. As the magnetooptical recording medium is rotated, it is irradiated by a laser beam at the reproduction level. As a result, the temperature of the first magnetic layer is caused to rise above room temperature but no higher than the Curie point $T_{C2}$ of the second magnetic layer. As a further result, the saturation magnetization $M_{S1}$ of the first magnetic layer declines, and the magnetization of this layer changes to an orientation perpendicular to the plane of the substrate following the sub-lattice magnetization of the second magnetic layer. Accordingly, the medium moves from state (b) to state (h) of FIG. 2, or from state (c) to state (i). When irradiation by the laser beam ends, the medium again returns to state (b) from state (h), or to state (c) from state (i).

Figure 6:
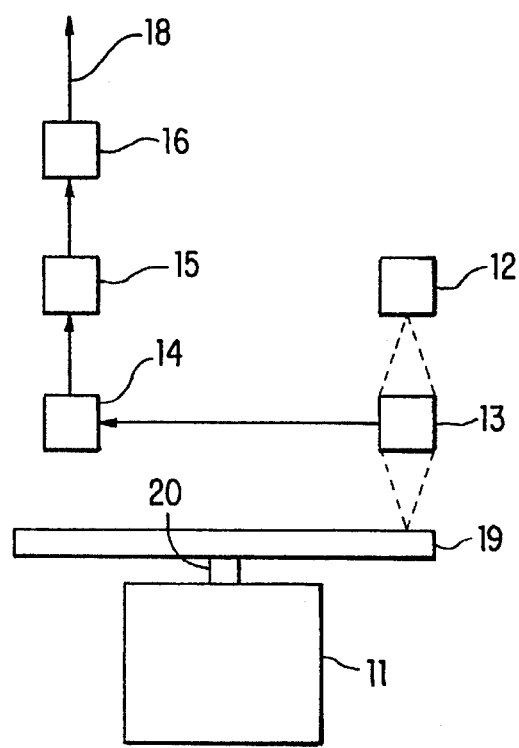
FIG. 6 is a summary drawing of the reproduction device according to an embodiment of the present invention.

An embodiment of the reproduction device of the present invention is shown generally in FIG. 6. The reproduction device primarily comprises a motor 11 for causing the rotation of the magnetooptical disk 19, for example by shaft 20, an irradiating and reproduction optical system 13 for conducting the beam of the laser beam light source 12 to the magnetooptical disk and to a detector 14, a restoration unit 15 and a digitized information output unit 16. The laser beam light source 12 may comprise a semiconductor laser or other suitable light source.

The reproduction device functions as follows: The magnetooptical disk 19 is rotated by the motor 11. The beam produced by the laser beam light source 12 passes through (or is reflected by) a beam splitter inside the irradiating and reproduction optical system 13 and is incidental on the disk 19. Light reflected from the medium is reflected by (or passes through) the beam splitter, and is incidental on the detector 14 via an analyzer (not shown). In place of the analyzer it would also be appropriate to use a polarized light beam splitter, in which case light containing the information would be output after being divided into two. The light is converted into an electrical signal by the detector 14. Information restored to digital information by the restoration unit 15 is output from the digital information output unit 16, thereby obtaining a reproduction signal 18.

Figure 3:
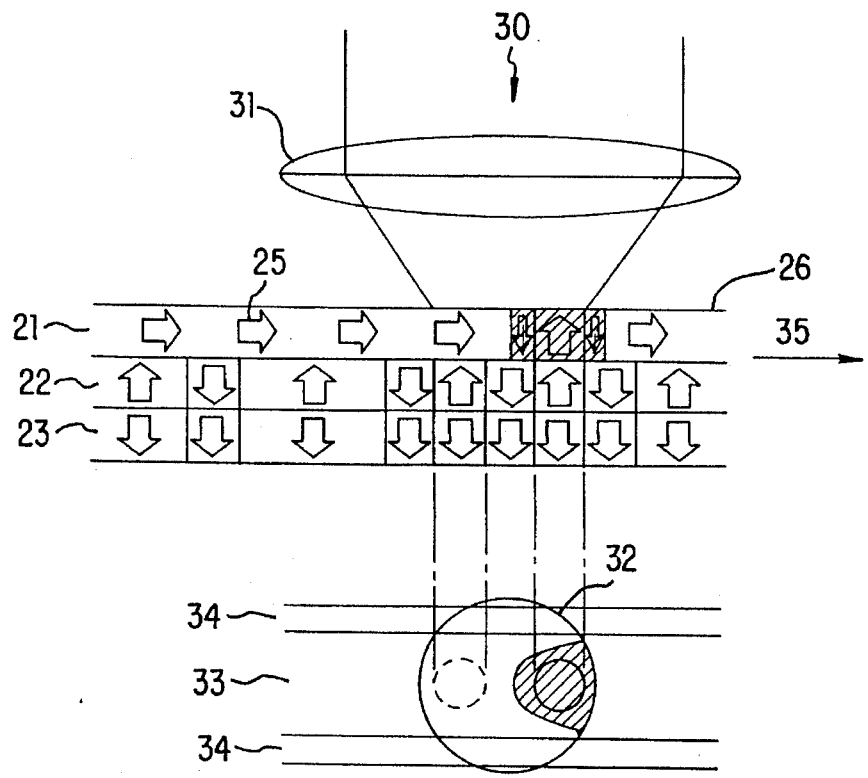
FIG. 3 is a summary drawing explaining the reproduction principle of the present invention.

As shown in FIG. 3, with the disk rotating in the direction of arrow 35, the size of the smallest recording marks yields a high recording density with the marks about one-third the diameter of the laser beam 30 focused by object lens 31 and incident on the recording medium 26. As such, approximately three of the smallest sized recording marks are contained within the outer diameter of the beam spot 32.

In FIG. 3, the three highlighted marks correspond to the digitized information 101, where 1 represents the digitized information corresponding to an upward magnetic orientation and 0 represents the digitized information corresponding to a downward magnetic orientation. During reproduction of a conventional magnetooptical recording medium, the information encoded as 101 cannot be distinguished from 110 and 011. The reason for this is that there is essentially no difference between these three configurations in terms of the amount of light reflected or in the polarized component of the light from the beam spot, making differentiation between the three impossible. In addition, in the direction perpendicular to the tracks, information from three tracks, including information from the target track 33 and the two adjacent tracks 34, would simultaneously exist within the beam spot. The result would be that information on the center track 33 may be mixed with the information from the two adjacent tracks 34, making accurate reproduction impossible. That is, the signal strength would be diminished due to "cross talk" between the three tracks.

Consequently, with a conventional recording medium it has been impossible to make the size of the marks considerably smaller than the diameter of the beam spot. Because the diameter of the beam spot is obtained by narrowing the laser beam using an optical system, it is impossible to make the beam spot smaller than the refraction limit of the optic system. Specifically, it is impossible to make the diameter of the beam spot smaller than the wavelength of the laser. As a result, a spot diameter of about 1 μm is the limit with current semiconductor lasers. Accordingly, there is a limit to the recording density with conventional magnetooptical recording medium.

However, the intensity of the laser beam is highest in the center, so the temperature in the beam spot is also highest in the center. In addition, because the magnetooptical recording medium is moving, the temperature of the magnetic layer corresponding to areas toward the back within the beam spot is higher than the temperature of other areas due to heat accumulation. Accordingly, the temperature of the region indicated by the shaded area in FIG. 3 is higher than the temperature of the surrounding regions.

In the present invention, the structure of the magnetooptical recording medium is designed so that this region in the first magnetic layer will be hotter than room temperature, but below the Curie point of the second magnetic layer. As a result, the saturation magnetization will decline and the magnetization of the first layer will change to an orientation perpendicular to the plane of the substrate following the sub-lattice magnetization of the second magnetic layer. Moreover, if the reproduction level of the laser is set so that the temperature of this region in the first magnetic layer reaches a temperature $T_R$ where the above-described phenomenon occurs under irradiation by the laser, the magnetic orientation in the first magnetic layer will change only in the region indicated by the shaded area of FIG. 3. The magnetic orientation of the first magnetic layer in the shaded region changes to a direction perpendicular to the plane of the substrate following the sub-lattice magnetization of the second magnetic layer.

In contrast to this, because the temperature in the regions outside of the shaded area has not yet risen to $T_R$, the magnetic orientation of the first magnetic layer will not have changed. That is, the magnetic orientation of the first magnetic layer in the unshaded region will not have changed to an orientation perpendicular to the plane of the substrate following the sub-lattice magnetization of the second magnetic layer. In the areas where the orientation has not changed to become perpendicular to the plane of the substrate, essentially no effect is seen on the polarization state of the beam, which is preferably linearly polarized. Because only a small area of the track where the magnetic orientation is perpendicular to the plane of the substrate causes the rotation of the linear polarization axis, either a decrease or increase can be detected in the amount of light reflected from the magnetic layer. Such decrease or increase in reflected light may be detected, for example, by passing a photosensitive element over the layer. If the light is converted into an electrical signal using a photosensitive device, only the information in the small area where the magnetic orientation is perpendicular to the plane of the substrate is reproduced. That is, the area of the mark that is being read is reproduced but adjoining marks in the same track or adjoining tracks are not reproduced. In this way, the present invention provides a reproduction principle for a magnetooptical recording method that allows for higher information density on the recording medium.

EXAMPLES

Example 1

This Example describes a first embodiment of a magnetooptical recording medium of the present invention.

First, a resin substrate is provided having a diameter of 130 mm in which is engraved a spiral-shaped tracking guidance groove. The tracking guidance groove has a pitch of 1.2 μm and a depth of 700 angstroms. The substrate and a sputtering target are placed in a vacuum chamber of a sputtering device, and the pressure inside the vacuum chamber is reduced to a vacuum condition having a pressure of not greater than $9.3 \times 10^{-5}$ Pa.

Argon gas is then introduced into the vacuum chamber to raise the pressure to 0.2 Pa. Reactive sputtering is accomplished using a first sputtering target of silicon while introducing nitrogen gas. A silicon nitride (hereafter referred to as SiN) layer, which is a first protective layer, is formed on the resin layer to a depth of 70 nm.

Next, a first magnetic layer of $Gd_{26}Fe_{55}Co_{19}$ is formed on the first protective layer to a depth of 30 nm. The first magnetic layer is formed under an argon pressure of 0.2 Pa in the vacuum chamber using a sputtering target of GdFeCo. This first magnetic layer has an easily magnetized axis in the plane of the substrate at room temperature and a Curie point of at least 350° C.

A second magnetic layer of $Tb_{22}Fe_{74}Co_4$ is formed on the first magnetic layer to a depth of 25 nm. The second magnetic layer is formed under an argon pressure of 0.2 Pa in the vacuum chamber using a sputtering target of TbFeCo. This second magnetic layer has a compensation temperature near room temperature, a coercivity force of at least 15 kOe at room temperature, and a Curie point of 180° C.

Next, a third magnetic layer of $Dy_{30}Fe_{35}Co_{35}$ is formed on the second magnetic layer to a depth of 60 nm. The layer is formed under an argon pressure of 0.2 Pa in the vacuum chamber using a sputtering target of DyFeCo. This third magnetic layer is rich in rare earth metals (RE rich), has an easily magnetized axis perpendicular to the plane of the substrate, has a coercivity force of 1.8 kOe at room temperature, and has a Curie point of 300° C.

Lastly, a second protective layer having a thickness of 700 angstroms is formed on the third magnetic layer. The second protective layer is formed under the same conditions as the first protective layer and is formed using the first silicon target.

The magnetooptical disk thus formed satisfies all of relationships (1)–(5), namely:

$T_{C1} > T_{C2}$ $T_{C2} < T_{C3}$ $H_C > \frac{\sigma_{W23}}{2M_{S2}t_2}$ $H_{C2} - \frac{\sigma_{W23}}{2M_{S2}t_2} > H_{C3} + \frac{\sigma_{W23}}{2M_{S3}t_3}$ and $H_{C3} > \frac{\sigma_{W23}}{2M_{S3}t_3}$ at room temperature.

Example 2

This Example describes a second embodiment of a magnetooptical recording medium of the present invention.

A sputtering device and resin substrate are prepared as in Example 1. After the resin substrate and a sputtering target are placed in the vacuum chamber of the sputtering device, the pressure inside the vacuum chamber is reduced to a vacuum condition having a pressure not greater than $9.3 \times 10^{-5}$ Pa. Argon gas is then introduced into the vacuum chamber to raise the pressure to 0.2 Pa.. Reactive sputtering is accomplished using a first target of silicon while introducing nitrogen gas. A first protective layer of silicon nitride is formed on the resin layer to a depth of 70 nm.

Next, a first magnetic layer of $Gd_{26}Fe_{55}Co_{19}$ is formed on the first protective layer to a depth of 40 nm. The first magnetic layer is formed under an argon pressure of 0.2 Pa. using a sputtering target of GdFeCo. This first magnetic layer has an easily magnetized axis in the plane of the substrate at room temperature and a Curie point of at least 350° C.

Following this, a second magnetic layer of $Tb_{22}Fe_{74}Co_4$ is formed on the first magnetic layer to a depth of 25 nm. The layer is formed under an argon pressure of 0.2 Pa. using a sputtering target of TbFeCo. The second magnetic layer has a compensation temperature near room temperature, a coercivity force of at least 15 kOe at room temperature, and a Curie point of 180° C.

A third magnetic layer of $Dy_{31}Fe_{35}Co_{34}$ is formed on the second magnetic layer to a depth of 30 nm. The layer is formed under an argon pressure of 0.2 Pa. using a sputtering target of DyFeCo. This third magnetic layer is RE rich, has an easily magnetized axis perpendicular to the plane of the substrate, has a coercivity force of 1.3 kOe at room temperature, and has a Curie point of 300° C.

Lastly, a second protective layer having a thickness of 700 angstroms is formed on the third magnetic layer under the same conditions as the first protective layer. The layer is formed using the first silicon sputtering target.

The magnetooptical disk thus formed satisfies relationships (1)–(4), namely:

$T_{C1} > T_{C2}$ $T_{C2} < T_{C3}$ $H_{C2} > \frac{\sigma_{W23}}{2M_{S2}t_2}$ and $H_{C2} - \frac{\sigma_{W23}}{2M_{S2}t_2} > H_{C3} + \frac{\sigma_{W23}}{2M_{S3}t_3}$ at room temperature.

Example 3

This Example describes a third embodiment of a magnetooptical recording medium of the present invention.

A sputtering device and resin substrate are prepared as in Example 1. After the resin substrate and a sputtering target are placed in the vacuum chamber of the sputtering device, the pressure inside the vacuum chamber is reduced to a vacuum condition having a pressure not greater than $9.3 \times 10^{-5}$ Pa. Argon gas is then introduced into the vacuum chamber to raise the pressure to 0.2 Pa. Reactive sputtering is accomplished using a first target of silicon while introducing nitrogen gas. A first protective layer of silicon nitride is formed on the resin layer to a depth of 70 nm.

Next, a first magnetic layer of $Gd_{26}Fe_{55}Co_{19}$ is formed on the first protective layer to a depth of 30 nm. The layer is formed under an argon pressure of 0.2 Pa. using a sputtering target of GdFeCo. The first magnetic layer has an easily magnetized axis in the plane of the substrate at room temperature and a Curie point of at least 350° C.

Following this, a second magnetic layer of $Tb_{24}Fe_{72}Co_4$ is formed on the first magnetic layer to a depth of 25 nm. The layer is formed under an argon pressure of 0.2 Pa. using a sputtering target of TbFeCo. This second magnetic layer has a compensation temperature around 70° C., a coercivity force of at least 10 kOe at room temperature, and a Curie point of 180° C.

A third magnetic layer of $Dy_{30}Fe_{35}Co_{35}$ is formed on the second magnetic layer to a depth of 40 nm. The layer is formed under an argon pressure of 0.2 Pa. using a sputtering target of DyFeCo. This third magnetic layer is RE rich, has an easily magnetized axis perpendicular to the plane of the substrate, has a coercivity force of 1.8 kOe at room temperature, and has a Curie point of 300° C.

On the third magnetic layer is formed a fourth magnetic layer of $Tb_{26}Fe_{72}Co_2$ to a depth of 20 nm. The layer is formed under an argon pressure of 0.2 Pa. using a sputtering target of TbFeCo. The fourth magnetic layer is RE rich, has an easily magnetized axis perpendicular to the plane of the substrate, has a coercivity force of at least 3 kOe at room temperature, and has a Curie point of 150° C.

A fifth magnetic layer of $Tb_{26}Fe_{35}Co_{39}$ is formed on the fourth magnetic layer to a depth of 60 nm. The layer is formed under an argon pressure of 0.2 Pa. using a sputtering target of TbFeCo. The fifth magnetic layer is RE rich, has an easily magnetized axis perpendicular to the plane of the substrate, has a coercivity force of at least 4 kOe at room temperature, and has a Curie point not less than 350° C.

Lastly, a second protective layer having a thickness of 700 angstroms is formed on the fifth magnetic layer under the same conditions as the first protective layer. The layer is also formed using the first silicon sputtering target.

The magnetooptical disk thus formed satisfies relationships (1)–(3), namely:

$$H_{C2} > \frac{\sigma_{W23}}{2M_{S2}t_2}$$

at room temperature.

Example 4

A magnetooptical recording device and a magnetooptical reproduction device are prepared as described below.

First is prepared an optical modulation-type overwriting magnetooptical recording device. The recording device is used to write information onto the magnetooptical recording medium in the magnetooptical reproduction method of the present invention. The recording device is prepared as generally shown in FIG. 5 and described above. In the recording device, the initializing reference magnetic field is comprised of a permanent magnet that produces a 6 kOe magnetic field oriented in the "A direction" on the surface of the magnetooptical recording medium. Similarly, the magnetic recording field comprises a permanent magnet that produces a 350 Oe magnetic field oriented in the "A direction" on the surface of the magnetooptical recording medium. As the laser beam light source is used a semiconductor laser with a wavelength of λ=780 nm. The numerical aperture (N.A.) of the irradiating optical system is 0.55.

Next is prepared a reproduction device for use in reading information recorded on a magnetooptical recording medium. The reproduction device is prepared as shown in FIG. 6 and described above. As the laser beam light source is used a semiconductor laser with a wavelength of λ=780 nm. The numerical aperture (N.A.) of the irradiating and reproduction optical system is 0.55.

Example 5

A magnetooptical disk prepared according to Example 1 is placed in the recording device prepared according to Example 4. The disk is rotated at 3600 rpm, and recording is accomplished by irradiating a position 30 mm from the center of the disk with a laser beam focussed to about 1 μm, with modulation occurring between a high level of $P_H$=13.0 mW and a low level of $P_L$=5.5 mW at a duty ratio of 50% and a frequency of 21 MHz. The length of the mark thus formed is 0.4 μm.

This process will now be explained in more detail. When the disk passes within the initializing reference magnetic field $H_{ini}$, the magnetization of the third magnetic layer is uniformly set to the "A direction" by the magnetic field. When this occurs, it is appropriate for the first magnetic layer to either follow the "A direction" or not follow the "A direction" orientation of the initializing reference magnetic field $H_{ini}$. In addition, the magnetic state of the second magnetic layer does not change because of the large coercivity force of the second layer.

Next, the thus initialized disk proceeds to the irradiating position of the laser beam. Recording is accomplished by irradiating the disk with the modulated laser beam.

Example 6

A magnetooptical disk prepared according to Example 2 is placed in the recording device of Example 4. Prior to using the device, the initializing reference magnetic field $H_{ini}$ is positioned next to the irradiating optical system. The disk is then rotated at 3600 rpm, and recording is accomplished by irradiating a position 30 mm from the center of the disk with a laser beam focussed to about 1 μm. Modulation of the laser beam occurs between a high level of $P_H$=12.0 mW and a low level of $P_L$=5.0 mW at a duty ratio of 50% and a frequency of 21 MHz. The length of the mark thus formed is 0.4 μm.

This process is now explained in greater detail. When the disk passes inside the initializing reference magnetic field $H_{ini}$, the magnetization of the third magnetic layer is uniformly set to the "A direction" by the magnetic field. When this occurs, it is appropriate for the first magnetic layer to either follow the "A direction" or not follow the "A direction" orientation of the initializing reference magnetic field $H_{ini}$. In addition, the magnetic state of the second magnetic layer does not change because of its large coercivity force.

Next, the thus initialized disk proceeds to the irradiating position of the laser beam, and is irradiated with a modulated laser beam. However, because the initializing reference magnetic field $H_{ini}$ is positioned next to the irradiating optical system as described above, the initialized magnetic layers maintain magnetization in the "A direction" until the position where irradiation with the laser beam occurs, in which state recording is accomplished.

Example 7

A magnetooptical disk prepared according to Example 3 is placed in the recording device of Example 4. The initializing reference magnetic field $H_{ini}$ of the device is positioned as in Example 4 (i.e., it is not positioned next to the irradiating optical system as in Example 6). The disk is rotated at 3600 rpm, and recording is accomplished by irradiating a position 30 mm from the center of the disk with a laser beam focussed to about 1 μm. Modulation of the laser beam occurs between a high level of $P_H$=14.5 mW and a low level of $P_L$=6.4 mW at a duty ratio of 50% and a frequency of 21 MHz. The length of the mark thus formed is 0.4 μm.

The process is now explained in greater detail. Because a fifth magnetic layer is provided on this disk for the purpose of initializing the third magnetic layer, the magnetization of the fifth magnetic layer is first uniformly set to the "A direction" by the initializing reference magnetic field $H_{ini}$. The magnetization of the third magnetic layer is also uniformly set to the "A direction." When this occurs, it is appropriate for the first magnetic layer to either follow the "A direction" or to not follow the "A direction orientation of the initializing reference magnetic field $H_{ini}$. In addition, the magnetic state of the second magnetic layer does not change because of the large coercivity force of the second layer."

When the thus initialized disk proceeds to the irradiating position of the laser beam, recording is accomplished by irradiating the disk with the modulated laser beam.

Example 8–10

The magnetooptical disks recorded in Examples 5–7 are individually placed in the reproduction device prepared according to Example 4. The disk is rotated at 3600 rpm, and reproduction is accomplished by irradiating the disk with a laser beam focussed to about 1 μm, while changing the reproduction level $P_R$.

This process is now explained in greater detail. In the irradiating position, the laser beam irradiates the disk from the side of the disk on which the first magnetic layer exists. The temperature of the disk rises rapidly, and in the region toward the back of the beam spot and within the beam's coverage the temperature rises to a temperature $T_R$. At this temperature $T_R$, the magnetization of the first magnetic layer changes to a direction perpendicular to the plane of the substrate following the sub-lattice magnetization of the second magnetic layer. Thus the orientation of the magnetization of the first magnetic layer changes to a direction perpendicular to the plane of the substrate following the sub-lattice magnetization of the second magnetic layer.

The laser beam reflected from the first magnetic layer is incidental on the detector via an analyzer, and is converted to an electrical signal. The C/N value of the reflected laser beam is measured, and the results are shown in FIG. 4.

Figure 4:
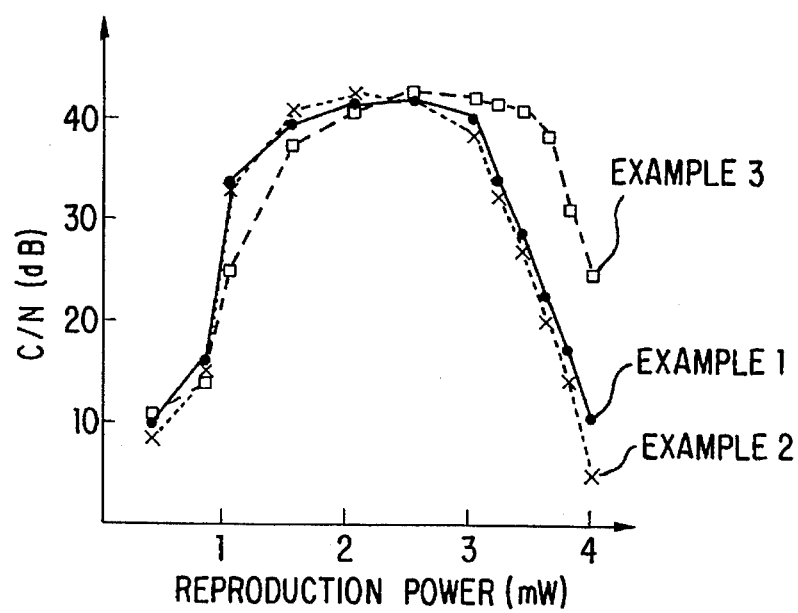
FIG. 4 is a graph showing the C/N values measured for embodiments of the present invention.

From FIG. 4, it can be seen that the C/N value rises sharply when the $P_R$ is at least 1.0 mW, and the C/N value drops sharply above a $P_R$ of 3.0 mW in the disks of Examples 5 and 6, and above a $P_R$ of 3.6 mW in the disk of Example 7.

Several conclusions may be made by analyzing the data thus obtained. When the $P_R$ is between 1.0 mW and 3.0 mW, only the magnetization of the region in the first magnetic layer toward the back of the beam spot and within the beam's coverage changes to a direction perpendicular to the plane of the substrate. At the same conditions, only one mark is reproduced. However, at a $P_R$ of less than 1.0 mW, even the magnetization of the region in the first magnetic layer toward the back of the beam spot and within the beam's coverage does not change to a direction perpendicular to the plane of the substrate. As a result, the recorded signal cannot be reproduced. Furthermore, when the $P_R$ is greater than 3.0 or 3.6 mW, a large area of the magnetic layer within the beam spot reaches the temperature $T_R$, and consequently, because magnetic reversal occurs in essentially the entire region within the beam's coverage, a plurality of marks are reproduced simultaneously.

In addition, when the $P_R$ is greater than 4.0, it is possible to verify that the low temperature process occurs and the recorded marks in the second magnetic layer are erased.

What is claimed is:

1. A magnetooptical recording medium with overwrite capabilities comprising a first magnetic layer, a second magnetic layer, and a third magnetic layer, wherein said first, second and third magnetic layers satisfy the relations:

$$T_{C1} > T_{C2}$$

$$T_{C2} < T_{C3}$$

and $$H_{C2} > \frac{\sigma_{W23}}{2M_{S2}t_2}$$

at room temperature, wherein $T_{C1}$, $T_{C2}$ and $TC3$ are the Curie points of the first, second and third magnetic layers, respectively; $H_{C2}$ is the coercivity of the second magnetic layer; $M_{S2}$ is the saturation magnetic moment of the second magnetic layer; $t_2$ is the thickness of the second magnetic layer; and $\sigma_{W23}$ is the magnetic wall energy between the second and third magnetic layers; and wherein the first magnetic layer has an easily magnetized axis in the plane of the first magnetic layer at room temperature and an easily magnetized axis perpendicular to the first magnetic layer at temperatures between room temperature and the Curie point of the second magnetic layer.

2. A magnetooptical recording medium according to claim 1, wherein said first, second and third magnetic layers further satisfy the following relationship at room temperature:

$$H_{C2} - \frac{\sigma_{W23}}{2M_{S2}t_2} > H_{C3} + \frac{\sigma_{W23}}{2M_{S3}t_3}$$

wherein $H_{C3}$ is the coercivity force of the third magnetic layer; $M_{S3}$ is the saturation magnetic moment of the third magnetic layer; and $t_3$ is the thickness of the third magnetic layer.

3. A magnetooptical recording medium according to claim 2, wherein said first, second and third magnetic layers further satisfy the following relationship at room temperature:

$$H_{C3} > \frac{\sigma_{W23}}{2M_{S3}t_3}$$

4. A magnetooptical recording medium according to claim 1, further comprising a fourth magnetic layer positioned between the second magnetic layer and the third magnetic layer for controlling an exchange coupling force between said second and third magnetic layers.

5. A magnetooptical recording medium according to claim 1, further comprising a fifth magnetic layer positioned adjacent the third magnetic layer for initializing said third magnetic layer.

6. A magnetooptical recording medium according to claim 1, wherein the second magnetic layer has an easily magnetized axis perpendicular to the second magnetic layer at temperatures between room temperature and the Curie point of the second magnetic layer.

7. A magnetooptical recording medium according to claim 1, wherein the third magnetic layer has an easily magnetized axis perpendicular to the third magnetic layer at temperatures between room temperature and the Curie point of the third magnetic layer.

8. A magnetooptical recording medium according to claim 1, wherein each of said first, second and third magnetic layers comprise at least one compound selected from the group consisting of GdFe, GdCo, GdFeCo, TbFe, TbCo, TbFeCo, DyFe, GdTbFe, TbDyFe, GdTbCo, DyFeCo and GdTbFeCo.

9. A method of magnetooptical reproduction comprising:

(a) rotating a multilayered magnetooptical recording medium with overwrite capabilities comprising a first magnetic layer, a second magnetic layer, and a third magnetic layer, wherein said first, second and third magnetic layers satisfy the relations:

$$T_{C1} > T_{C2}$$

$$T_{C2} < T_{C3}$$

and $$H_{C2} > \frac{\sigma_{W23}}{2M_{S2}t_2}$$

at room temperature, wherein $T_{C1}$, $T_{C2}$ and $TC3$ are the Curie points of the first, second and third magnetic layers, respectively; $H_{C2}$ is the coercivity of the second magnetic layer; $M_{S2}$ is the saturation magnetic moment of the second magnetic layer; $t_2$ is the thickness of the second magnetic layer; and $\sigma_{W23}$ is the magnetic wall energy between the second and third magnetic layers;

(b) radiating a laser beam onto a portion of said rotating recording medium; and (c) converting light from said laser beam reflected from the rotating recording medium into an electrical signall wherein the first magnetic layer has an easily magnetized axis in the plane of the first magnetic layer at room temperature and an easily magnetized axis perpendicular to the first magnetic layer at temperatures between room temperature and the Curie point of the second magnetic layer.

10. A method according to claim 9, wherein said radiated laser beam causes said portion of the first magnetic layer of said recording medium to rise to a temperature between room temperature and the Curie point $T_{C2}$ of the second magnetic layer.

11. A method according to claim 9, wherein said radiated laser beam causes magnetization of a part of said portion of the first magnetic layer of said recording medium to change to a direction perpendicular to the plane of said recording medium.

12. A method according to claim 9, wherein said radiated laser beam has a power of from about 1.0 mW to about 3.6 mW as measured on a surface of said recording medium.

13. A method according to claim 9, wherein said radiated laser beam has a power of from about 1.0 mW to about 3.0 mW as measured on a surface of said recording medium.

14. A method according to claim 9, wherein marks having a size of less than about 0.5 μm on said recording medium are accurately reproduced.

15. A method of magnetooptical overwrite recording comprising:

(a) rotating a multilayered magnetooptical recording medium with overwrite capabilities comprising a first magnetic layer, a second magnetic layer, and a third magnetic layer, wherein said first, second and third magnetic layers satisfy the relations:

$T_{C1} > T_{C2}$ $T_{C2} < T_{C3}$ and $H_{C2} > \dfrac{\sigma_{W23}}{2M_{S2}t_2}$ at room temperature, wherein $T_{C1}$, $T_{C2}$ and $T_{C3}$ are the Curie points of the first, second and third magnetic layers, respectively; $H_{C2}$ is the coercivity of the second magnetic layer; $M_{S2}$ is the saturation magnetic moment of the second magnetic layer; $t_2$ is the thickness of the second magnetic layer; and $\sigma_{W23}$ is the magnetic wall energy between the second and third magnetic layers;

(b) uniformly orienting the direction of magnetization of the third magnetic layer of the recording medium to a predetermined direction without changing the direction of orientation of magnetization of the second magnetic layer of said recording medium;

(c) radiating a laser beam onto a portion of said rotating recording medium; and (d) pulse modulating an intensity of said laser beam between a high level and a low level in accordance with binary data to be recorded on said portion of said recording medium, wherein the first magnetic layer has an easily magnetized axis in the plane of the first magnetic layer at room temperature and an easily magnetized axis perpendicular to the first magnetic layer at temperatures between room temperature and the Curie point of the second magnetic layer.

16. A method according to claim 15, wherein said radiated laser beam has a power of greater than about 4.0 mW as measured on a surface of said recording medium.

17. A method according to claim 15, wherein marks having a size of less than about 0.5 μm are formed on said recording medium.

18. A method according to claim 15, wherein said orienting step (b) comprises passing said recording medium through an initializing reference magnetic field $H_{ini}$.

19. A method according to claim 15, wherein said recording medium further comprises a fourth magnetic layer and wherein said orienting step (b) further comprises uniformly orienting the direction of magnetization of the fourth magnetic layer of the recording medium to a predetermined direction without changing the direction of orientation of magnetization of the second magnetic layer of said recording medium.

20. A method according to claim 10, wherein said first, second and third magnetic layers further satisfy the following relationship at room temperature:

$$H_{C2} - \dfrac{\sigma_{W23}}{2M_{S2}t_2} > H_{C3} + \dfrac{\sigma_{W23}}{2M_{S3}t_3}$$

wherein $H_{C3}$ is the coercivity of the third magnetic layer; $M_{S3}$ is the saturation magnetic moment of the third magnetic layer; and $t_3$ is the thickness of the third magnetic layer.

21. A method according to claim 16, wherein said first, second and third magnetic layers further satisfy the following relationship at room temperature:

$$H_{C2} - \dfrac{\sigma_{W23}}{2M_{S2}t_2} > H_{C3} + \dfrac{\sigma_{W23}}{2M_{S3}t_3}$$

wherein $H_{C3}$ is the coercivity of the third magnetic layer; $M_{S3}$ is the saturation magnetic moment of the third magnetic layer; and $t_3$ is the thickness of the third magnetic layer.

* * * * *